(12) United States Patent
Pastilha

(10) Patent No.: US 7,914,028 B2
(45) Date of Patent: Mar. 29, 2011

(54) OCCUPANT PROPELLED VEHICLE

(76) Inventor: Adelino Pastilha, Vallhalla, NY (US)

( * ) Notice: Subject to any disclaimer, the term of this patent is extended or adjusted under 35 U.S.C. 154(b) by 209 days.

(21) Appl. No.: 12/245,370

(22) Filed: Oct. 3, 2008

(65) Prior Publication Data

US 2009/0091099 A1 Apr. 9, 2009

Related U.S. Application Data

(60) Provisional application No. 60/998,041, filed on Oct. 5, 2007.

(51) Int. Cl.
*B62M 1/14* (2006.01)
(52) U.S. Cl. .......................... 280/244; 280/253
(58) Field of Classification Search .................. 280/253, 280/257, 244, 242.1
See application file for complete search history.

(56) References Cited

U.S. PATENT DOCUMENTS

| | | | |
|---|---|---|---|
| 616,021 A * | 12/1898 | Schaibly ...................... 280/234 |
| 2,123,390 A | 7/1938 | Welch | |
| 4,052,912 A | 10/1977 | Vukelic | |
| 4,437,677 A | 3/1984 | Ksayian | |
| 4,574,649 A | 3/1986 | Seol | |
| 4,811,964 A | 3/1989 | Horn | |
| 4,828,284 A | 5/1989 | Sandgren | |
| 4,925,200 A | 5/1990 | Jones | |
| 5,039,122 A * | 8/1991 | Deutch et al. .................. 280/234 |
| 6,315,313 B1 * | 11/2001 | Huang ........................... 280/216 |
| 6,419,251 B1 | 7/2002 | Chueh | |
| 6,619,682 B1 | 9/2003 | Carr et al. | |
| 6,902,177 B2 * | 6/2005 | Lindsay et al. ............... 280/282 |
| 6,932,370 B2 * | 8/2005 | Jones et al. .................... 280/282 |
| 7,445,225 B2 * | 11/2008 | Volk .............................. 280/282 |
| 7,588,110 B2 * | 9/2009 | Martino ........................ 180/210 |
| 7,726,676 B2 * | 6/2010 | Monno .......................... 280/234 |
| 2004/0036249 A1 * | 2/2004 | McGuire et al. .............. 280/253 |
| 2005/0035569 A1 * | 2/2005 | Ikeda et al. ................... 280/244 |
| 2007/0164534 A1 * | 7/2007 | Simon ........................ 280/242.1 |

* cited by examiner

*Primary Examiner* — Joanne Silbermann
*Assistant Examiner* — Tashiana Adams
(74) *Attorney, Agent, or Firm* — Joseph R. Carvalko, Jr.

(57) ABSTRACT

An occupant propelled vehicle is provided that includes a frame having a front portion and a rear portion, front and rear wheels, a platform for the occupant, an integrated articulating steering mechanism and a drive mechanism. The steering mechanism provides the multiple function of power transmission to a drive train, maneuvering the vehicle through a 360° turning radius and reversing the direction of the vehicle, so that it can travel both forward and backward. In one embodiment, the driving mechanism includes a power transfer means having a first end connected to a drive sprocket through a chain and a second end connected to another drive sprocket through the chain both sprockets mounted on a front wheel for propulsion. The steering means transfers power through the chains that in turn rotate the sprockets and associated wheel propelling the vehicle.

5 Claims, 10 Drawing Sheets

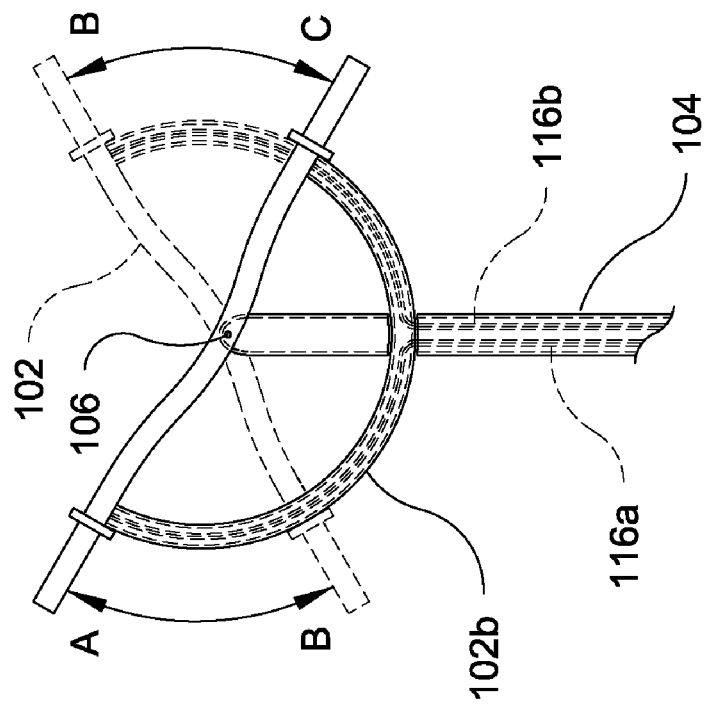
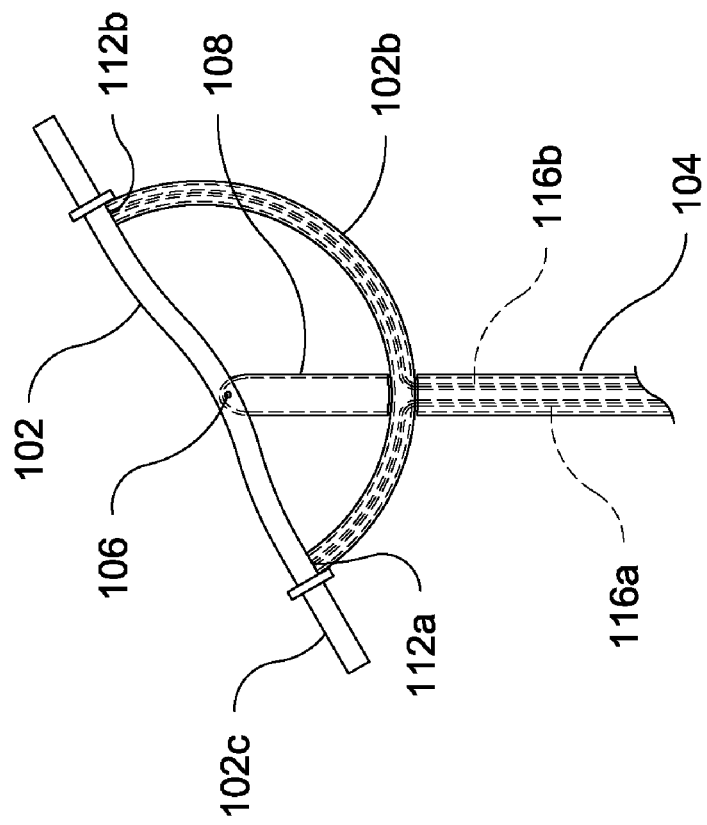
Fig. 2A
Fig. 2B

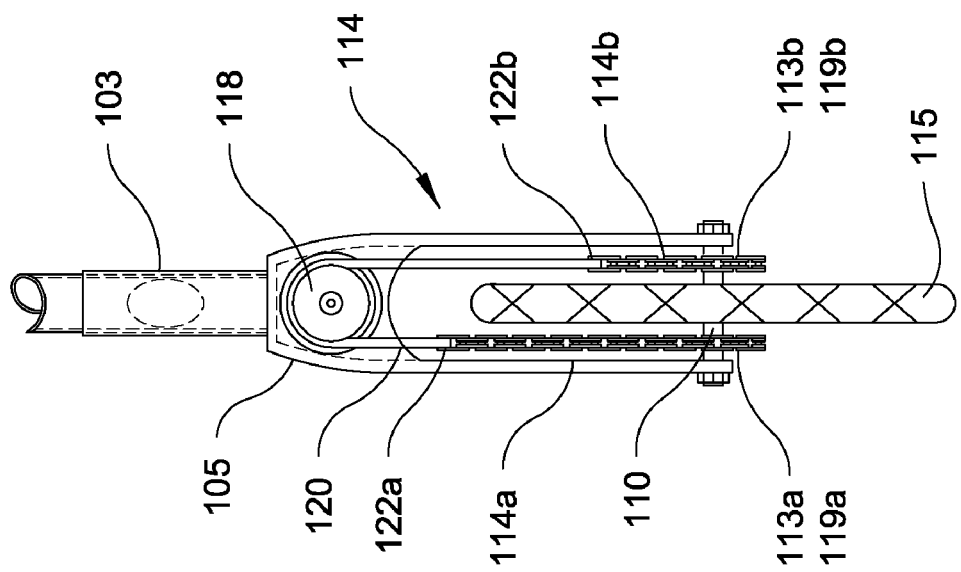
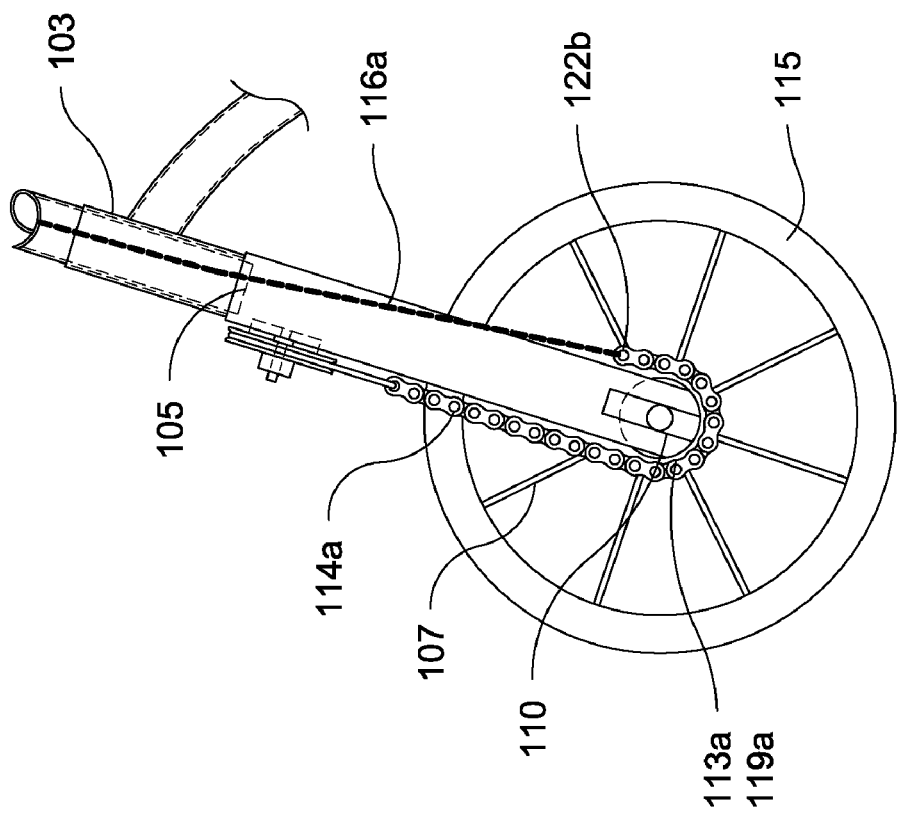

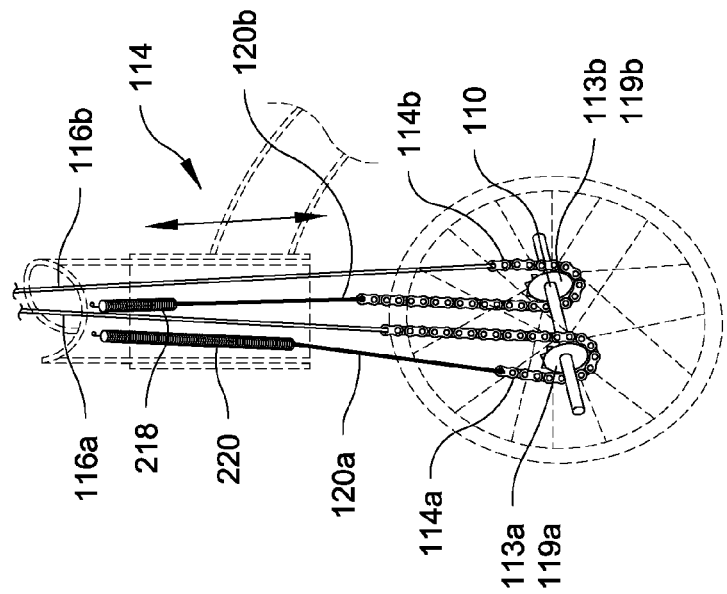
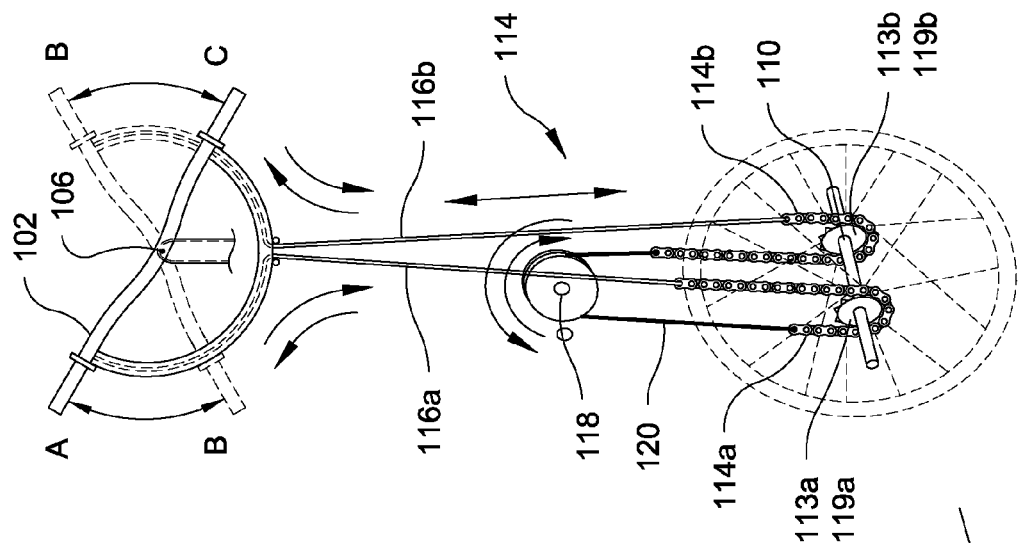
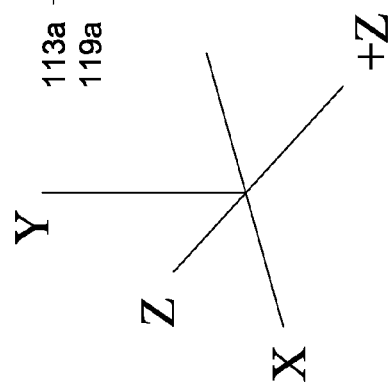

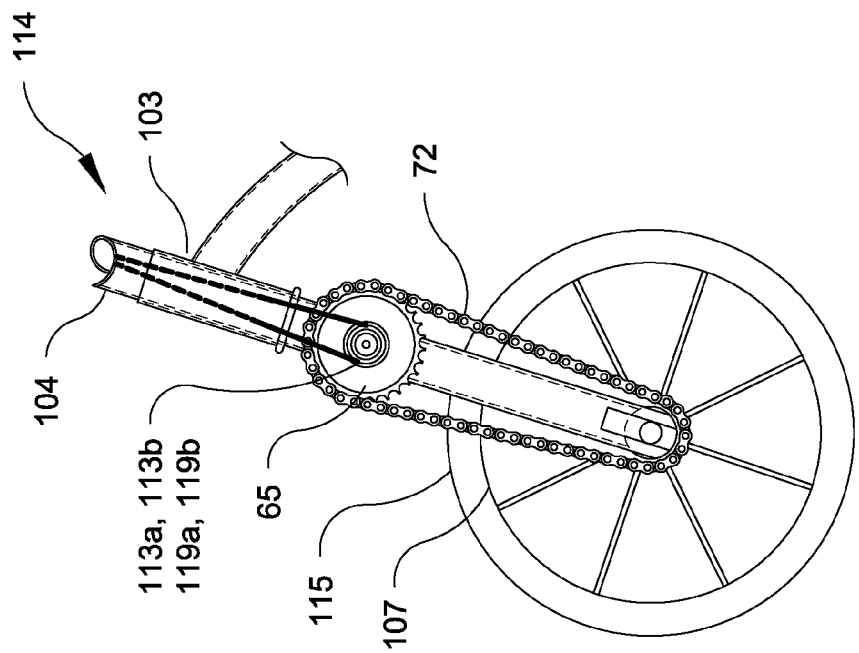
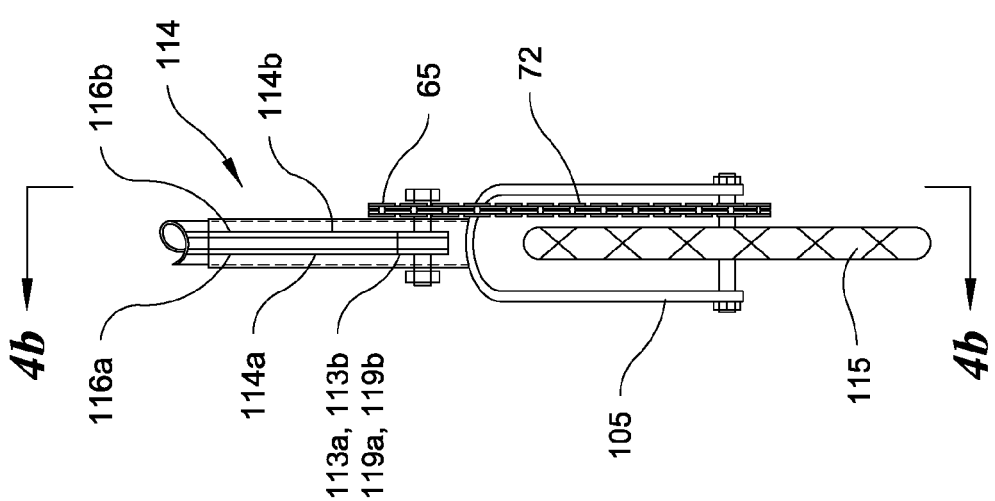
Fig. 4b
Fig. 4a

OCCUPANT PROPELLED VEHICLE

CLAIM FOR PRIORITY

This application claims the priority of Provisional Application No. 60/998,041, entitled "OCCUPANT PROPELLED VEHICLE," filed Oct. 5, 2007, which is incorporated by reference herein in its entirety.

FIELD OF THE INVENTION

This invention relates to the field of self propelled vehicles such as cycles, scooters, and cars and other devices.

BACKGROUND OF THE INVENTION

This invention relates to improvements in cycles, such as bicycles, tricycles, quadricycles, scooters, cars and devices such as exercise equipment and more particularly, to a hand actuated type devices such as vehicle embodying an oscillating drive member pivoting about an axis transverse to the vehicle and driveably linked to the wheels providing self propulsion.

Vehicles of a similar type have been known in the past and have been described to some extent in certain U.S. patents including U.S. Pat. Nos. 6,619,682; 6,419,251; 4,828,284; 4,811,964; 4,925,200; 4,574,649; 4,437,677; 4,052,912; 2,123,390. These patents generally disclose designs embodying certain common elements, such as cable drive system, but most of these have shortcomings inasmuch as all involve mechanisms that are complex and not simple to assemble and operate. Today's consumer insists upon improved constructions of lighter and simpler design features, and especially reliability.

It is also not a common feature for self propelled bicycles, tricycles, quadricycles, scooters, cars and devices such as exercise machines to move in a forward and reverse direction without complex transmissions. These are usually impracticable on simple vehicles such as embodied in bicycles, tricycles and scooters. However, a simple means for reversing the direction of the vehicle would provide a beneficial feature now unattainable in the low cost sector of the bicycle, tricycle, quadricycle, scooter and exercise machines.

SUMMARY OF THE INVENTION

An aspect of the present invention pertains to a new steering bar that provides a motion transfer means having a first end connected to one drive sprocket through a chain and a second end connected to another drive sprocket through another chain wherein oscillating the motion transfer means through the chains alternately rotates to turn the drive wheel in a continuous motion.

In one embodiment, a self propelling vehicle includes: a frame which includes a front portion and rear portion; at least one front wheel provided on the front portion at least one wheel provided on said rear portion said platform provided between said front and rear portions on said frame to support an occupant; a steering mechanism integrated with a drive mechanism including: two or more drive sprockets mounted on a front wheel portion so that the drive sprockets are rotatable with the drive axles such that the drive sprockets are adapted to rotate the drive axles in only one predetermined direction.

In another embodiment of the invention, a steering mechanism provided on a frame is integrally connected to drive mechanisms, rotating through an angle of 180°. The operator of the vehicle without any further act or effort can then propel the vehicle in a reverse direction. In the configuration of a quadricycle or small car, the ability to effortlessly move in a forward and reverse direction can greatly benefit a wide variety of applications, such as provided by golf carts, cargo movers and especially those instances that require tight parking conditions.

In another embodiment of the invention an occupant propelled vehicle includes a frame, said frame including a front portion and connecting a rear portion; at least one front wheel provided on said portion of said frame; at least one rear wheel provided on said rear portion of said frame; said frame having a platform for supporting an occupant; a mechanism that integrally provides a steering means and a power means wherein said power means comprises: two or more drive sprockets mounted on a front wheel portion so that said drive sprockets are rotateably engageable with said wheel axle; a motion transfer means having a first end connected to one of the drive sprockets through a drive means and a second end connected to another of the drive sprockets through the drive mans thereto; and the drive means drivingly interconnected to each of said drive sprockets, wherein oscillation of said motion transfer means through the drive means alternately rotates said drive sprocket and said wheel therewith to propel the vehicle.

Although the invention will be described in terms of various mechanisms that drive self-propelled vehicles, the invention is not limited to other devices, such as exercise equipment that may utilize the invention described herein.

With the foregoing summary in mind, the present invention will be distinguished over the prior art in the following description and application of new components, design criteria and utility to the field of the invention.

BRIEF DESCRIPTION OF THE DRAWINGS

The advantages, nature, and various additional features of the invention will appear more fully upon consideration of the illustrative embodiments now to be described in detail in connection with accompanying drawings wherein:

FIG. 2a illustrates a handle bar drive and steering mechanism in accordance with the principles of the invention;

FIG. 2b illustrates a handle bar drive and steering mechanism in accordance with the principles of the invention;

FIG. 3a illustrates a chain driven sprocket mechanism side view in accordance with the principles of the invention;

FIG. 3b illustrates a chain driven sprocket mechanism front view in accordance with the principles of the invention;

FIG. 3c illustrates a chain driven sprocket mechanism in accordance with the principles of the invention;

FIG. 3d illustrates a chain driven sprocket mechanism in accordance with the principles of the invention;

FIG. 4a illustrates a chain driven sprocket mechanism in accordance with the principles of the invention;

FIG. 4b illustrates a chain driven sprocket mechanism in accordance with the principles of the invention;

DETAILED DESCRIPTION OF THE INVENTION

According to an aspect of the invention, an occupant propelled vehicle is provided, wherein the direction of travel, including a forward direction and a reverse direction, may be easily changed without involving complex mechanisms. In one embodiment of the invention an occupant propelled vehicle includes a frame that has a front portion to accept a steering means. The frame is also connected to a rear portion with at least one rear wheel mounted on the rear portion. At least one driven wheel is attached through the front portion of the frame. The steering means cooperates to transfer vertical motion or oscillation of the steering means into an operable driving force for the driven wheel. The steering means includes a lever pivotally mounted on the frame connected to a driving mechanism. The pivot permits the lever to oscillate. The steering means is free to rotate 360° about a vertical axis passing through the pivot. Thus, the direction of travel of the driven wheel may be reversed from a forward direction to a reverse direction by turning the steering means by 180°. Various embodiments of the drive mechanisms are disclosed herein for converting the oscillating motion of the steering means into the rotational motion of the driven wheel. In one embodiment, the drive mechanism includes two or more drive sprockets, with and without ratcheted mounts, connected to the driven wheel such that the wheel rotates when the lever is caused to oscillate about its pivot. In other embodiment, the drive mechanism includes two or more bevel gears and a rotating shaft arranged between the steering mechanism and the driven wheel.

Figure 1A:
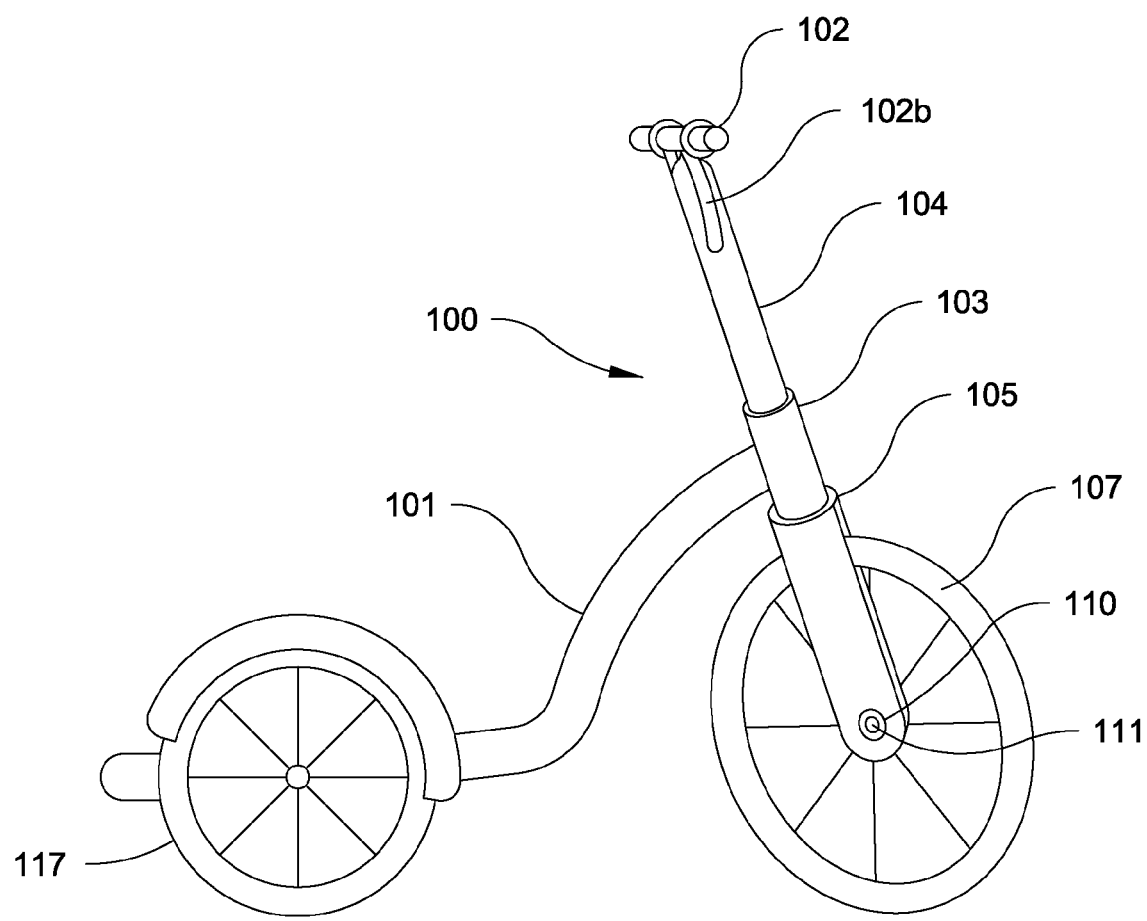
FIG. 1a illustrates a side view of an embodiment of a vehicle in accordance with the principles of the invention.
Figure 1B:
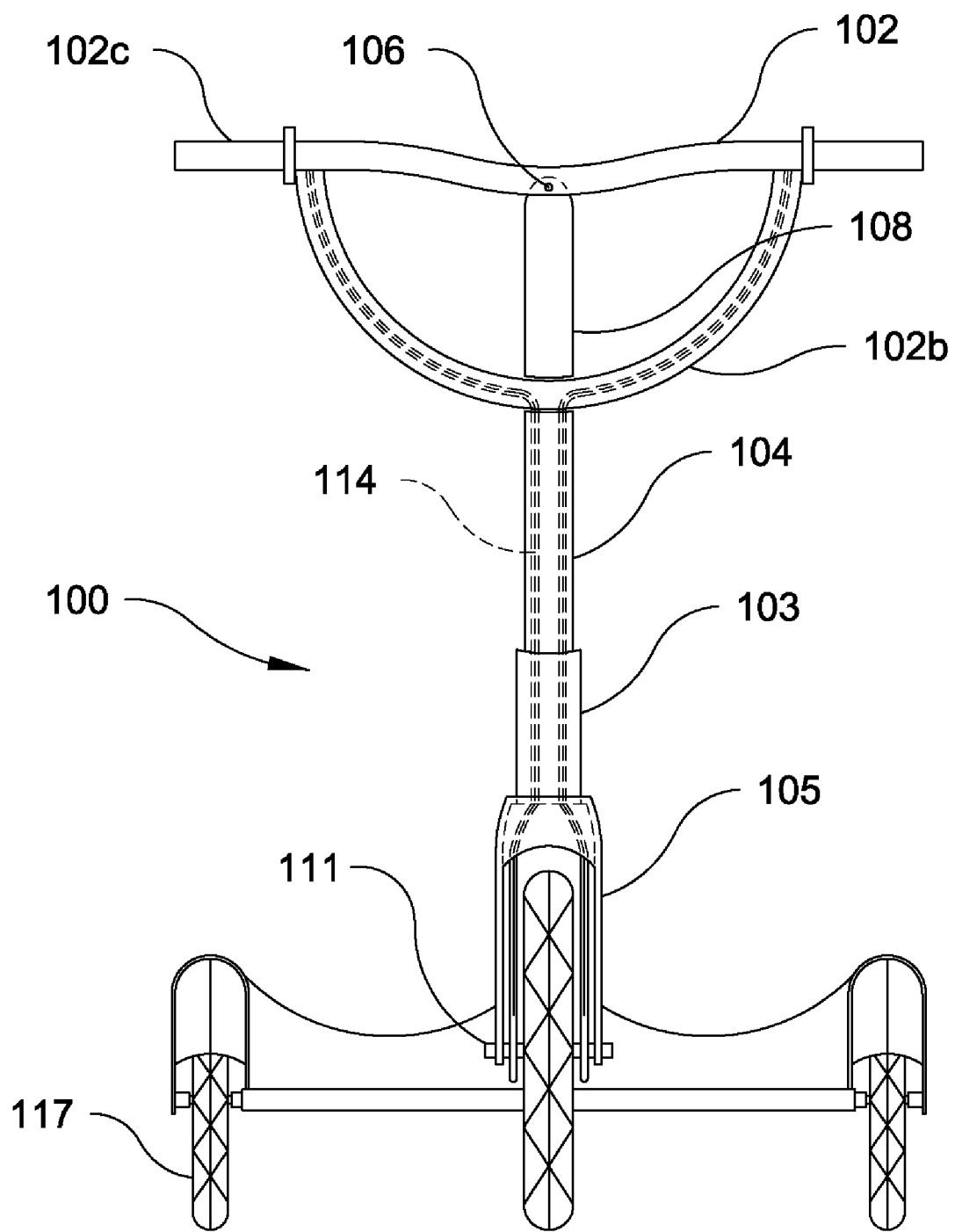
FIG. 1b illustrates a front view of an embodiment of a vehicle in accordance with the principles of the invention.
Figure 4D:
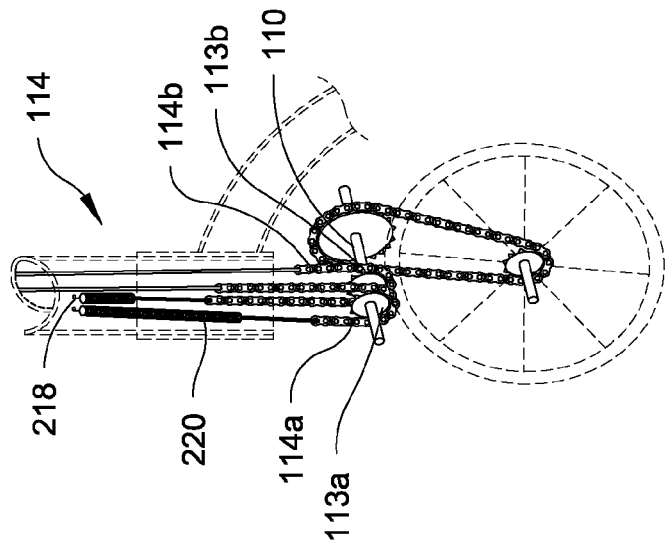
FIG. 4d illustrates a chain driven sprocket mechanism in accordance with the principles of the invention.
Figure 4C:
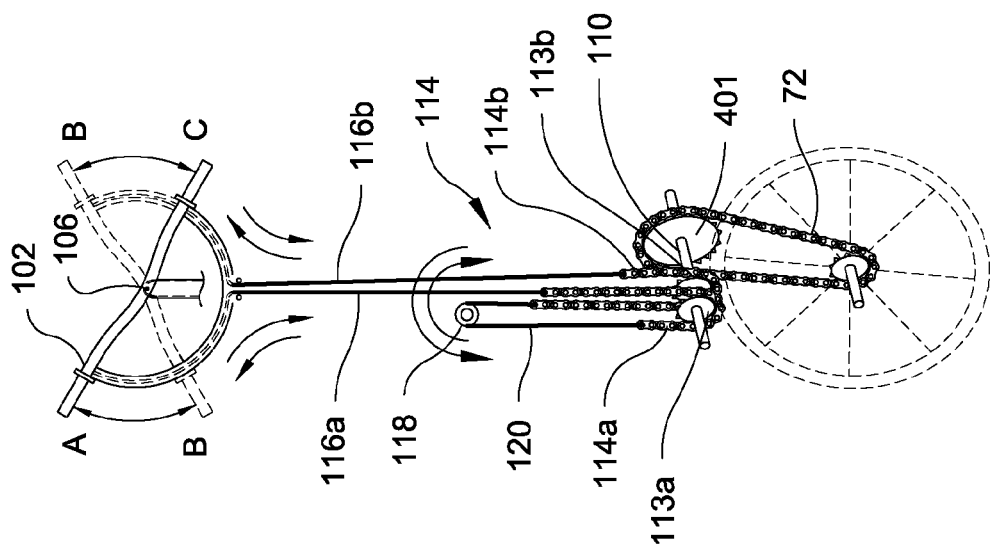
FIG. 4c illustrates a chain driven sprocket mechanism in accordance with the principles of the invention.

With reference to FIGS. 1a-1b, a self propelled exemplar vehicle e.g. a bicycle 100 includes a frame 101 having a fork tube 103 so as to integrally mount a fork 105 to which a wheel 107 is rotatably secured through a threaded front axle 110 and a pair of opposing bolts 111. The frame 101 also contains a rear wheel assembly 117, which includes at least one wheel and tire. Depending upon the application the rear wheel assembly 117 may be fixed or rotatable upon the frame 101.

A steering and directional change mechanism as illustrated in FIGS. 1a-1b includes an articulating handle bar 102 that engages an upper portion 104 of the fork 105. FIG. 1b taken with FIG. 2a and FIG. 2b illustrates the propulsion system for the self propelled vehicle 100 which is operated by moving the handle bar 102 in a generally see-saw motion to push and pull upon a drive train 114. In FIG. 2a the user grasps optional handle grips 102c, and pushes the handle bar 102 downwardly while maintaining the chosen direction of travel. As such the handle bar 102 serves to integrate the multiple functions of (a) powering the drive train 114; (b) steering to maneuver the vehicle 100 through a 360° turning radius and (c) optionally reversing the direction of the vehicle by turning the handle bar 102 through an angle of 180°.

The handle bar 102 is pivotally mounted on a vertical member 108, which attaches to the upper portion 104. The handle bar 102 is typically manufactured as one cylindrical piece with a central pivot 106 rotationally located at the member 108 to permit oscillation as shown in FIG. 2b, of the handle bar 102 through a fixed angle AB measured from the vertex of the bar as formed from the central pivot 106 aligned horizontally. A guide way 102b is attached to the handle bar at location 112a and 112b, each approximately equidistant from the central pivot 106 point or rotation. Through the guide way 102b a pair of flexible drive means such as braided wires 116a and 116b attach between the handle bar 102 at location 112a and 112b and a proximal end of a power transmission drive train 114 (of FIG. 3b) as will be more fully described below.

FIG. 3a and FIG. 3b show the front wheel assembly comprised of the fork 105 and the wheel 107, upon which is mounted a tire 115. In one embodiment the front axle 110 mounts into the fork 105 through a hub and spoke arrangement common to wheel bearing bicycle wheels. On each side of the hub is mounted a one-way clutch mechanism 119a and 119b engagingly attached to an associated pair of sprockets 113a and 113b, respectively. As will be discussed below in greater detail, the clutch permits the sprocket to drive the axle 110 in a preferred direction. As will be understood by those skilled in the art of mechanical design, the arrangement of the sprocket pair 113a, 113b on the clutch pair 119a, 119b or alternatively the clutch pair 119a, 119b on the sprocket pair 113a, 113b is a design choice.

Referring to FIGS. 2a, 2b and FIGS. 3a, 3b, the drive means 114 is in substantial part a series of linked segments that include a pair of chain segments 114a and 114b, each of which is entrained around the pair of sprockets 113a and 113b, respectively such that the free ends of the chain 114a, 114b segments connect through connecting wire 116a and 116b, respectively to the handle bar 102 at connecting point 112a and 112b, utilizing common fastening means such as retainer keys or pins to insure a reliable connection. FIG. 3b shows the connection of the chain 114a and 114b as attached to wire 120 at attachment points 122a and 122b; wire 120 is then secured around a guide 118.

In FIG. 3c, the handle bar 102 is illustrated as having moved through angle AB measured from the vertex of the bar 102 as formed from the central pivot 106. In a first cycle, moving the bar 102 from position A to B as shown, pulls the wire 116b upwardly and in turn pulls the chain 114b through the sprocket 113b rotating the sprocket 113b counterclockwise. The sprocket 113b is fixed to clutch 119b, and in the counter clockwise direction of the sprocket 113b, the clutch 119b rigidly secures the axle 110 to move the attached wheel 115 in a counterclockwise direction propelling the vehicle 100 forward. Simultaneously, the chain 114a through its connection to wire 120 and related chain 114a pulls the related sprocket 113a, which is also integrally attached to the one-way clutch mechanism 119a causing the sprocket 113a to free wheel or coast relative to the axle 110 in the clockwise direction as shown in FIG. 3c. In the next alternate cycle moving the bar 102 from position B to C as shown, pulls the wire 116a upwardly and in turn pulls chain 114a through sprocket 13a rotating sprocket 113a counterclockwise. The sprocket 113a is affixed to the clutch 119a and in the counterclockwise direction the sprocket 119a rigidly secures the axle 109 to move the attached wheel 115 in a counterclockwise direction moving the vehicle 100 forward. The chain 114b through its connectors to wire 120b and related chain 114b pulls the related sprocket 113b so as to free wheel or coast relative to the axle 110. The clutch function may be performed utilizing a ratchet device wherein the hub turns freely in one direction, but is stopped from turning in the opposite direction by an internal pawl that locks into gear teeth within the body of the device, preventing counter-clockwise rotation and thus engaging and locking the sprocket to permit the turning of the hub and wheel. Such clutch means are well known by individuals skilled in the art of mechanical engineering and design.

As will be apparent from the description of the mechanism illustrated in FIG. 3c, the axle 110 rotates in the direction perpendicular to the X-Y plane as shown, turning the wheel 115, which results in a movement of the attached frame in the −Z direction. Since the fork 105 (FIG. 3a), to which a wheel 107 is secured is freely rotatable in the fork tube 103 (FIG. 3a), turning the handlebars 102 through an angle of 180° reverses the direction of the movement of the attached frame in the +Z direction.

Referring now to FIG. 3d, an embodiment of drive mechanism 114 is illustrated. In the illustrated embodiment, chains 114a, 114b are connected to wire members 120a, 120b. Wire members 120a, 120b are connected to spring members 220, 218 respectively. Spring members 218, 220 are fixedly connected to upper portion 104.

In an embodiment, the occupant propelled vehicle 100 therefore includes: a frame 101, said frame including a front portion generally depicted as the front fork tube 103 or any suitable means to accept a steering mechanism as heretofore described and a rear portion 120; an axle mounted on the frame 101 and at least one driven wheel 107 mounted on the axle 110 which is attached through the front fork tube 103 of said frame 101; and at least one rear wheel 117 provided on said rear portion 120 of said frame 101; and a steering means 102 assembly which cooperates to alternately transfer vertical motion of said steering means 102 into an operable driving force for the driven wheel 107 and associated tire 115, said assembly including an elongate, horizontally disposed lever such as handlebar 102, which is pivotably mounted on the upper portion 104 and a drive mechanism comprising two or more ratcheted drive sprockets 113a, 113b mounted on a front wheel 107 so that the drive sprockets 113a, 113b rotate with axle 110 in one direction and free wheel in an opposite direction, without rotating axle 110. It will also be apparent that the rate at which the handle bar 102 is articulated through a fixed angle will determine the relative speed of the vehicle 100.

FIG. 4a-d represent alternate embodiments of the invention. The embodiments are apparent from the description of the mechanism illustrated in FIG. 3a-d. Drive mechanism 114 in this exemplary embodiment is similar to the drive mechanism 114 of the embodiment illustrated in FIGS. 3a-3d. However, instead of connecting axle 110 to wheel 115, axle 110 is connected to fork 105. An additional chain member 72 and sprocket 65 is used to transfer the rotation of axle 110 to wheel 115. Such an arrangement permits the use of, for example, a regular bicycle wheel, instead of using a wheel with double one-way sprockets.

Figure 5:
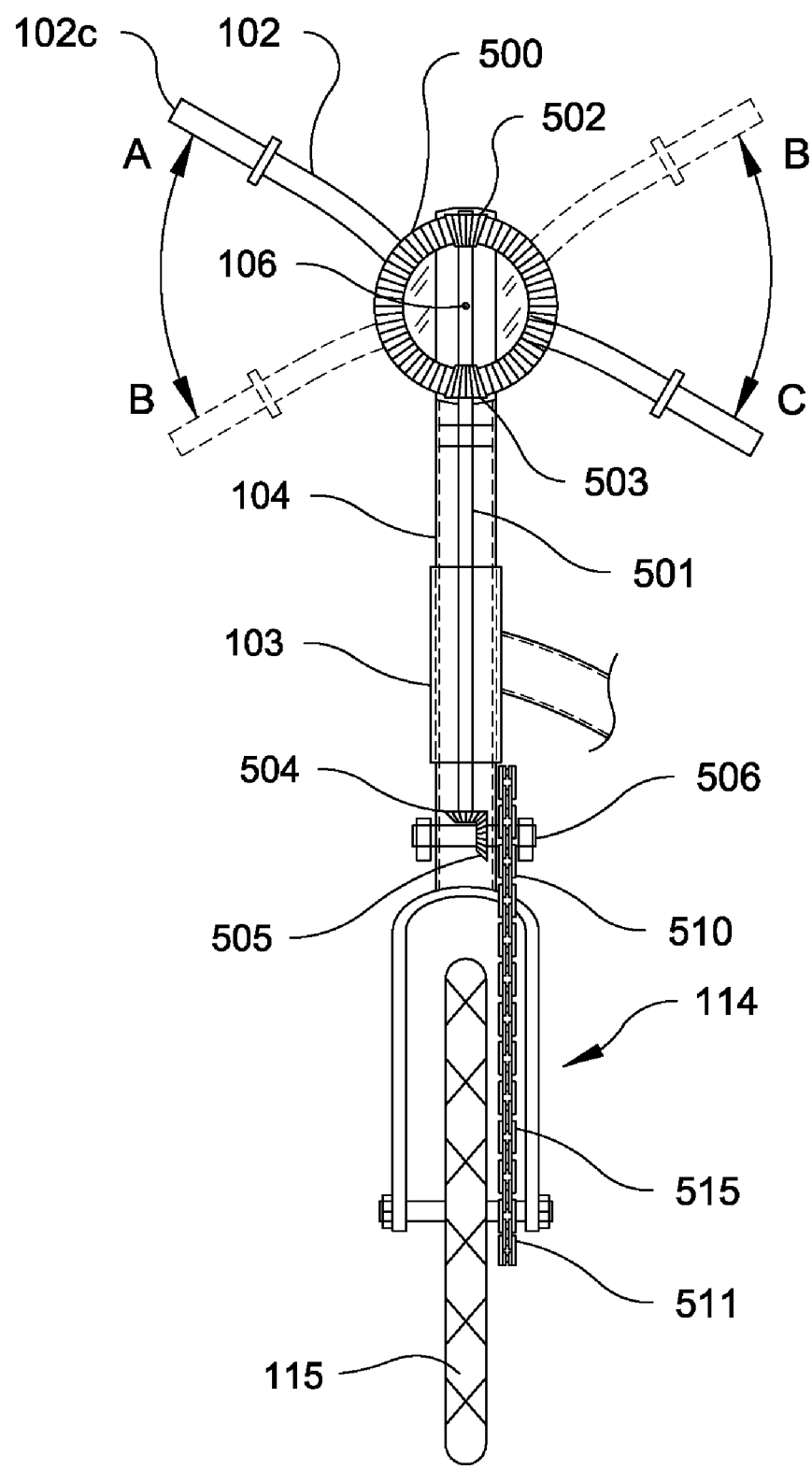
FIG. 5 illustrates an alternative mechanism, which consists of a shaft and gears instead of cables while utilizing the same movement in accordance with the principles of the invention.

FIG. 5 illustrates a drive shaft mechanism comprised of one oscillating handle bar 102 attached to a large bevel gear 500 and drive shaft 501. Shaft 501 has three bevel gears 502, 503, 504. Bevel gear 502, 503, 504, are one way clutch type that cause the shaft 501 rotate in one continuous motion when the oscillating handle bar 102 swings from point B to point C. The bevel gear 502 is locked by the one way clutch, making the shaft 501 rotate clockwise. When oscillating handle bar 102 moves from point A to point B, bevel gear 503 locks, causing the shaft 501 to continue its clockwise rotation.

As the shaft 501 rotates, so does bevel gear 504, which in turn engages bevel gear 505, which is attached to shaft 506. When shaft 506 rotates, so does sprocket 510, causing the chains 515 and the wheel to rotate.

Figure 6:
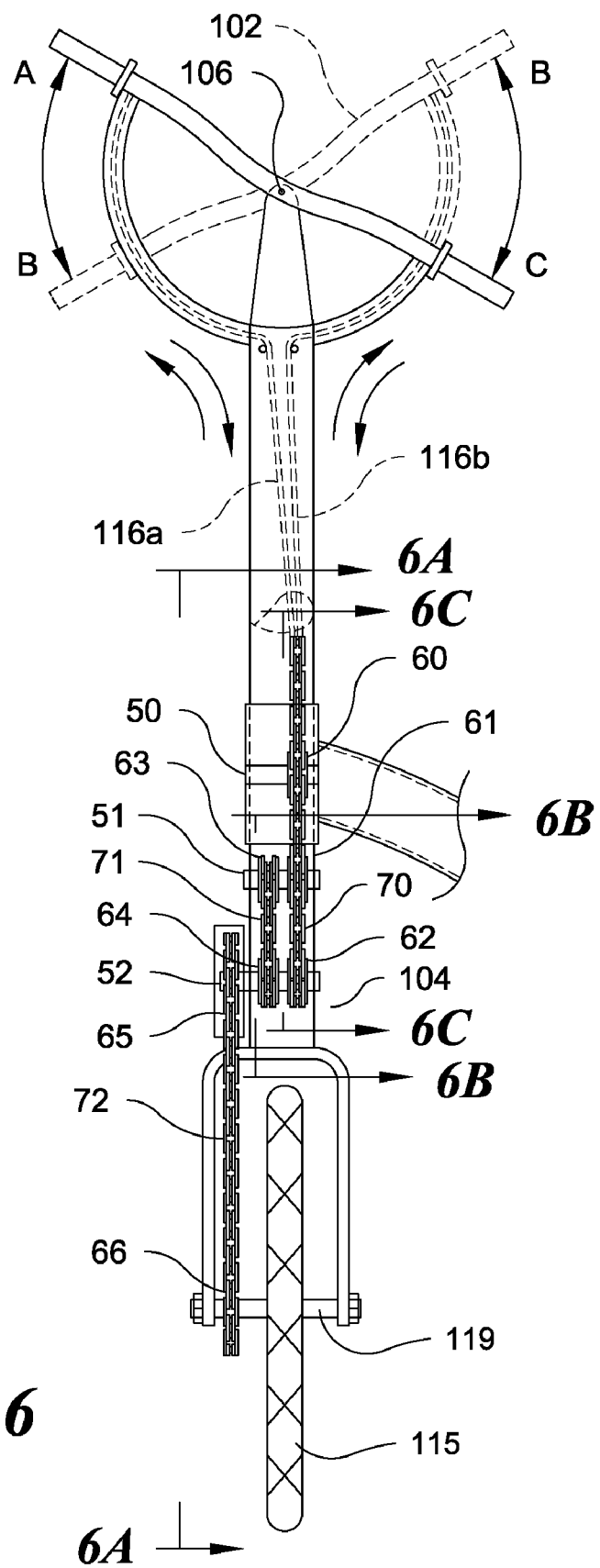
FIG. 6 illustrates an alternative mechanism, which consists of a shaft and gears instead of cables while utilizing the same movement in accordance with the principles of the invention.
Figure 6A:
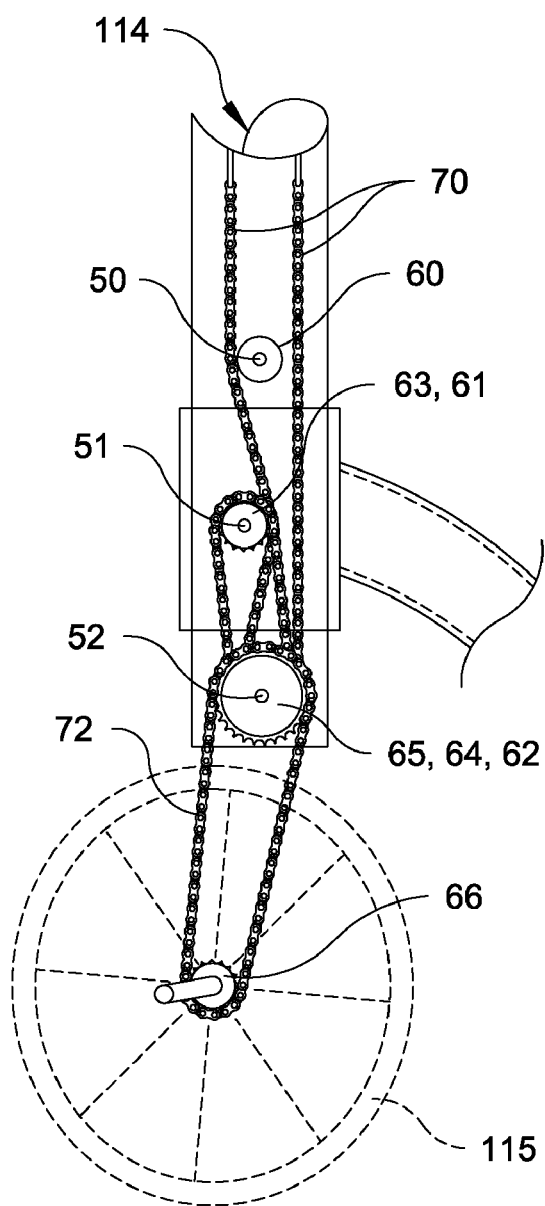
FIGS. 6a-6c illustrate cross-section views along lines 6A-6A, 6B, and 6C of the alternative mechanism illustrated in FIG. 6.
Figure 6C:
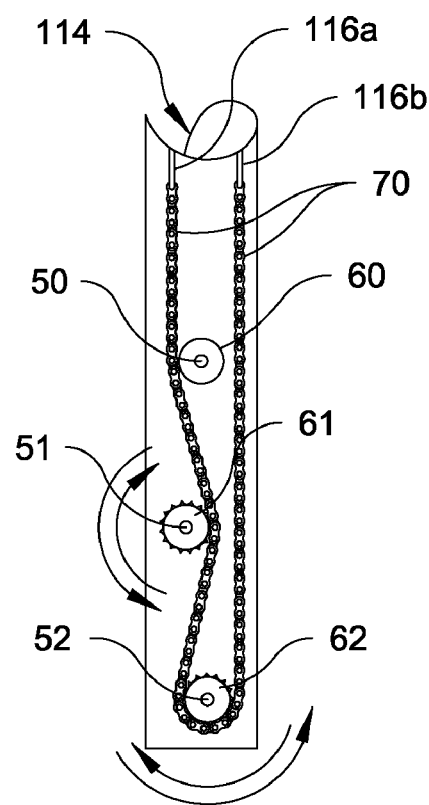
Figure 6B:
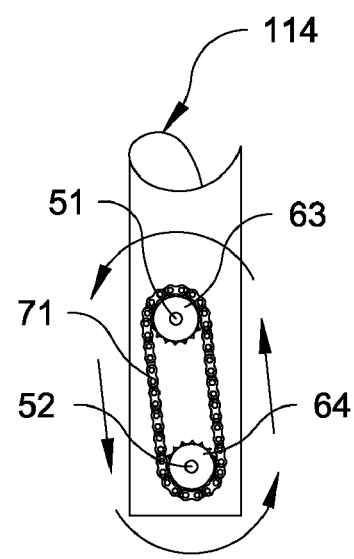

FIGS. 6 and 6A illustrate an alternate embodiment of the invention wherein an occupant propelled vehicle drive mechanism includes the handle bar 102 illustrated as having moved through angle AB. In a first cycle, moving the bar 102 from position C to B as shown, pulls the wire 116b upwardly and in turn pulls the chain 114 through a sprocket 60 rotating the guide sprocket 60 counterclockwise. Sprocket 60, 61, and 62, are mounted around shafts 50, 51, 52, respective which are rotatably supported on the upper fork tube 104.

Each of the sprockets 61, 62 is formed with a one-way mechanism, such as a one way clutch, ratchet gearing, unidirectional bearing and the like, that couples the sprockets 61, 62 to the associated shaft 51, 52 when the sprocket 61, 62 is rotated in one direction and uncouples the sprocket 61, 62 from the associated shaft 51, 52 when the sprocket 61, 62 is rotated in the opposite direction.

In addition, there is a secondary chain 70 running associated with the sprocket 62 and sprocket 61 having two ends of the chain 70 attached to the cable ends 116a, 116b as shown in FIG. 6A, Section C.

The arrangement of the chain 70 enables the sprockets 61, 62, and guide sprocket 60 to be rotated with the oscillation motion of the handlebar 102, and sprockets 61, 62 to be rotated in the opposite directions. The sprockets 61, 62 are thus complimentarily coupled to their associated shafts 51, 52 due to their one-way mechanisms, resulting in rotation of shafts 51, 52.

For the purpose of rotating shaft 51 during the period when sprocket 61 is decoupled from the shaft 51 the embodiment further includes a second sprocket 63 mounted around shaft 51 at the side of sprocket 61, another sprocket 64 securely mounted around shaft 52 at the side of sprocket 62, and a chain 71 received around sprockets 63 and 64 thereby additionally transmitting rotation from shaft 51 to shaft 52. As shown in FIG. 6 and FIG. 6A, Sections A-A, B and C a rotating member such as a wheel mounted to a vehicle can be moved by oscillating bar 102 like a seesaw.

It is expressly intended that all combinations of those elements that perform substantially the same function in substantially the same way to achieve the same results are within the scope of the invention. Therefore, that while the present invention has been disclosed and described with reference to several variations and embodiments thereof, it will be apparent, as noted above, that additional variations and modifications may be made therein. It is also noted that the present invention is independent of the vehicle being controlled, and is not limited to the application described herein.

What is claimed is:

1. An occupant propelled vehicle comprising: a frame comprising: a tubular member; a steering assembly comprising: a first member, said first member rotatably secured by said tubular member; a generally elongate second member pivotably mounted to said first member and having a first and a second end, said generally elongate second member adapted to rotate 360° about an axis passing through said first member; and a generally fork-like member secured to said first member at an end distal to said second member; a drivable wheel rotatably secured to said fork-like member via a first axle; and a drive mechanism connecting said drivable wheel to said generally elongate member, said drive mechanism adapted to convert generally oscillating motion of said generally elongate member into rotational force for said drivable wheel wherein said drive mechanism further comprises: a generally semi-circular guide way having a first and a second end, said first and second ends of said guide way being connected generally near said first and second ends of said generally elongate second member respectively; a first wire member having a first and a second end, said first end of said first wire member being connected near said first end of said generally elongate second member, said first wire member passing through said guide way and said first member; a first chain having a first and a second end, said first end of said first chain being connected to said second end of said first wire member; a first sprocket rotatably engaging said first chain; a second wire having a first and second end, said first end of said second wire being connected to said second end of said first chain; a first spring member having a first and a second end, said first end of said first spring member being connected to said second end of said second wire, and said second end of said first spring member being fixedly connected to said frame; a third wire member having a first and a second end, said first end of said third wire member being connected near said second end of said generally elongate second member, said third wire member passing through said guide way and through said first member; a second chain having a first and a second end, said first end of said second chain being connected to said second end of said third wire member; a second sprocket rotatably engaging said second chain; a fourth wire having a first and a second end, said first end of said fourth wire being connected to said second end of said second chain; and a second spring member having a first and a second end, said first end of said second spring member being connected to said second end of said fourth wire, and said second end of said second spring member being fixedly connected to said frame, wherein said first and second sprockets are secured to said first axle via a first and a second clutch, and wherein said first and second clutches permit said first and second sprockets to drive said first axle in only one predetermined direction.

2. The vehicle of claim 1, wherein the drive mechanism further comprises: a first bevel gear fixedly secured to said generally elongate second member; a drive shaft; a second and third bevel gears fixedly secured to said drive shaft via a first and second clutch respectively, said second and third bevel gears rotatably engaged with said first bevel gear, wherein said second and third bevel gears are restrained by said first and second clutches to rotate said drive shaft in only one predetermined direction; a fourth bevel gear fixedly secured to said drive shaft; a second axle; a fifth bevel gear fixedly secured to said second axle, said fifth bevel gear being rotatably engaged with said fourth bevel gear; a first sprocket fixedly mounted on said second axle; a second sprocket fixedly mounted on said first axle; and a chain rotatingly engaging said first and second sprockets.

3. The vehicle of claim 1, wherein the drive mechanism further comprises: first sprocket mounted on said first axle; second and third sprockets mounted on said second axle; fourth, fifth, and sixth sprockets mounted on said third axle; wherein said first chain rotatably engages said first, second, and fourth sprockets such that said first and fourth sprockets rotate in a direction opposite to the direction of rotation of said second sprocket, a second chain rotatingly engaging said third and fifth sprockets; a seventh sprocket mounted on said first axle; and a third chain rotatingly engaging said sixth and seventh sprockets.

4. The vehicle of claim 1, further comprising a platform for the occupant.

5. The vehicle of claim 1, further comprising a rear wheel assembly.

* * * * *